(12) United States Patent
Golobay et al.

(10) Patent No.: US 7,779,052 B2
(45) Date of Patent: Aug. 17, 2010

(54) NETWORK MANAGEMENT SYSTEM

(75) Inventors: Paul M. Golobay, Farmers Branch, TX (US); John M. Hahs, Celina, TX (US); Hieu V. Mai, Forth Worth, TX (US); Kelvin R. Russell, Boonville, MO (US); Parker C. Webb, Rowlett, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 946 days.

(21) Appl. No.: 11/298,605

(22) Filed: Dec. 12, 2005

(65) Prior Publication Data

US 2007/0136319 A1    Jun. 14, 2007

(51) Int. Cl.
*G06F 17/30* (2006.01)
(52) U.S. Cl. ...................... 707/811; 707/803
(58) Field of Classification Search ............ 707/10, 707/100, 103 Y
See application file for complete search history.

(56) References Cited

U.S. PATENT DOCUMENTS

| | | | |
|---|---|---|---|
| 5,809,297 A * | 9/1998 | Kroenke et al. ............. 707/102 |
| 6,400,265 B1 | 6/2002 | Saylor et al. |
| 6,442,573 B1 | 8/2002 | Schiller et al. |
| 6,457,003 B1 * | 9/2002 | Gajda et al. ................. 707/4 |
| 6,577,311 B1 | 6/2003 | Crosby et al. |
| 7,349,957 B1 * | 3/2008 | Matthews et al. .......... 709/223 |
| 2005/0245191 A1 * | 11/2005 | Falcon ........................ 455/3.06 |
| 2007/0101381 A1 * | 5/2007 | Furlong et al. .............. 725/105 |

FOREIGN PATENT DOCUMENTS

| | | |
|---|---|---|
| EP | 986259 | 3/2000 |
| EP | 1069715 | 1/2001 |
| EP | 1073223 | 1/2001 |
| JP | 09-288684 | 11/1997 |
| JP | 2000-004272 | 1/2000 |
| JP | 2000-59759 | 2/2000 |
| JP | 2000-311103 | 11/2000 |
| JP | 2001-007840 | 1/2001 |

* cited by examiner

*Primary Examiner*—Baoquoc N To

(57) ABSTRACT

A system includes a relational database and processing logic. The relational database is configured to define a relationship between a group of logical activities and groups of physical commands that perform the logical activities. The processing logic is configured to receive a request to perform one logical activity of the group of logical activities, translate the one logical activity into one group of physical commands using the relational database, and cause the one logical activity to be performed on a remote device using the one group of physical commands.

15 Claims, 16 Drawing Sheets

DATABASE 500

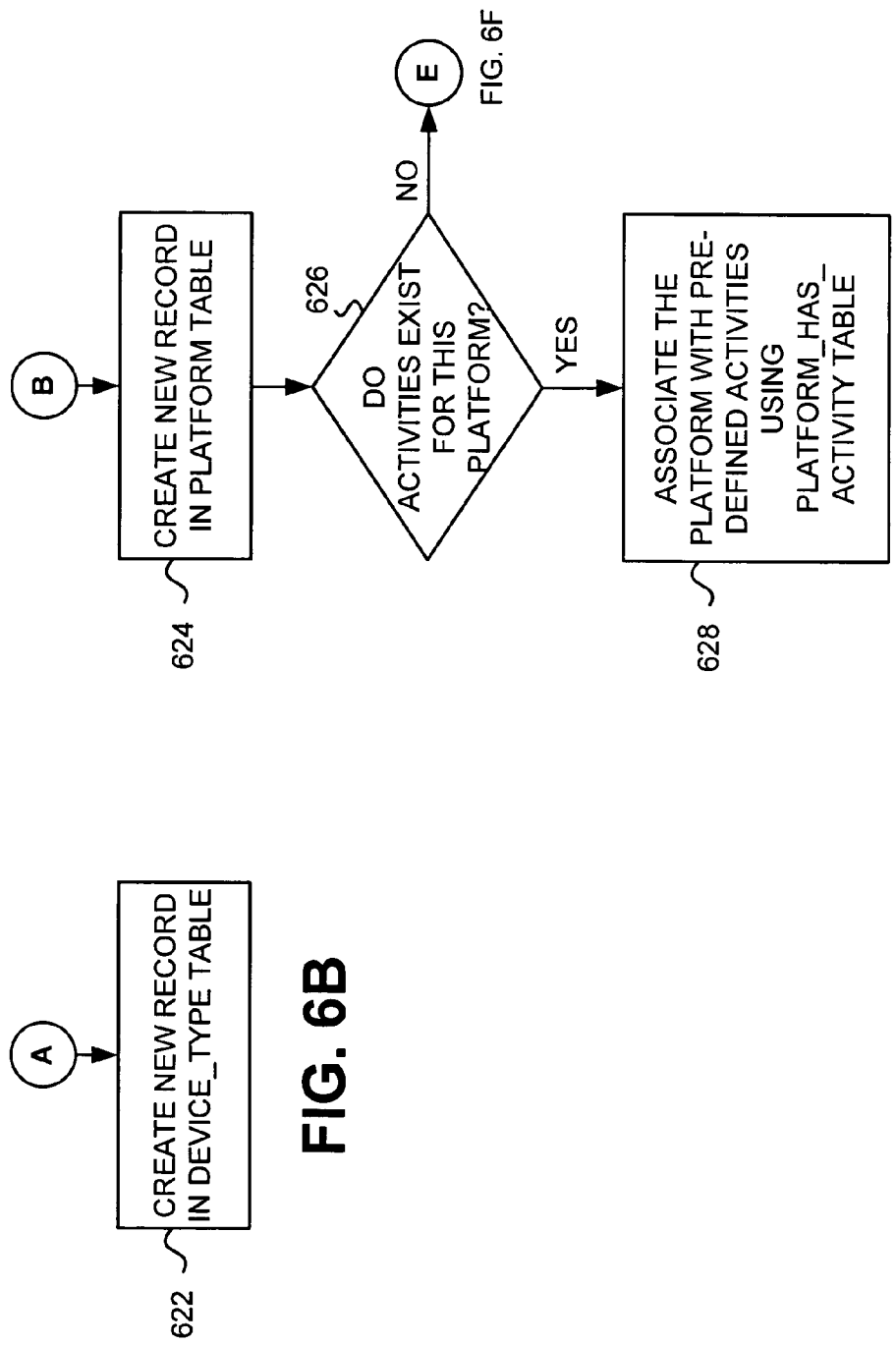

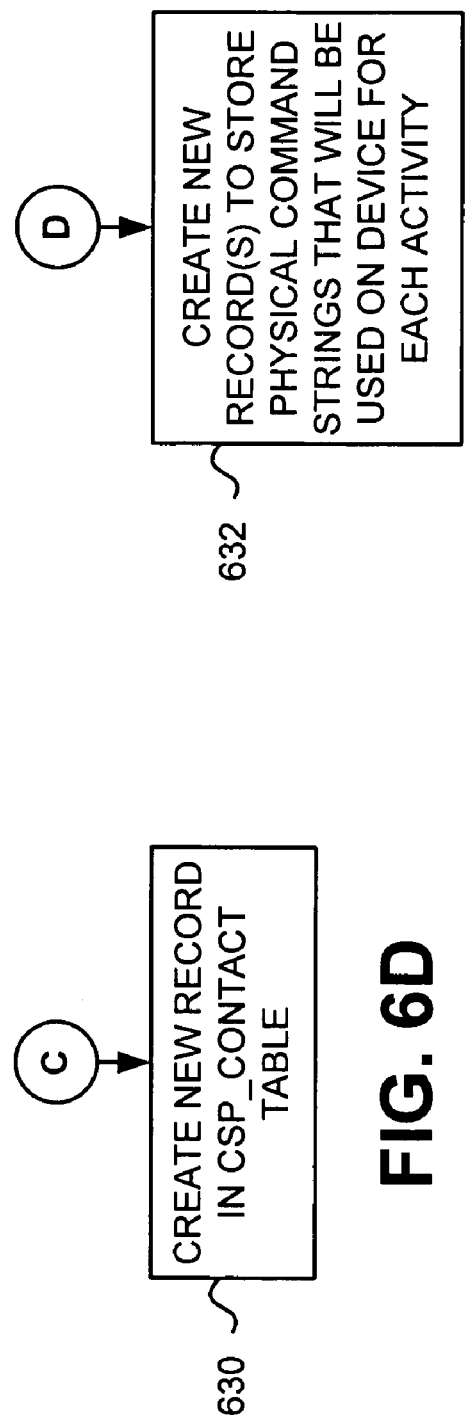

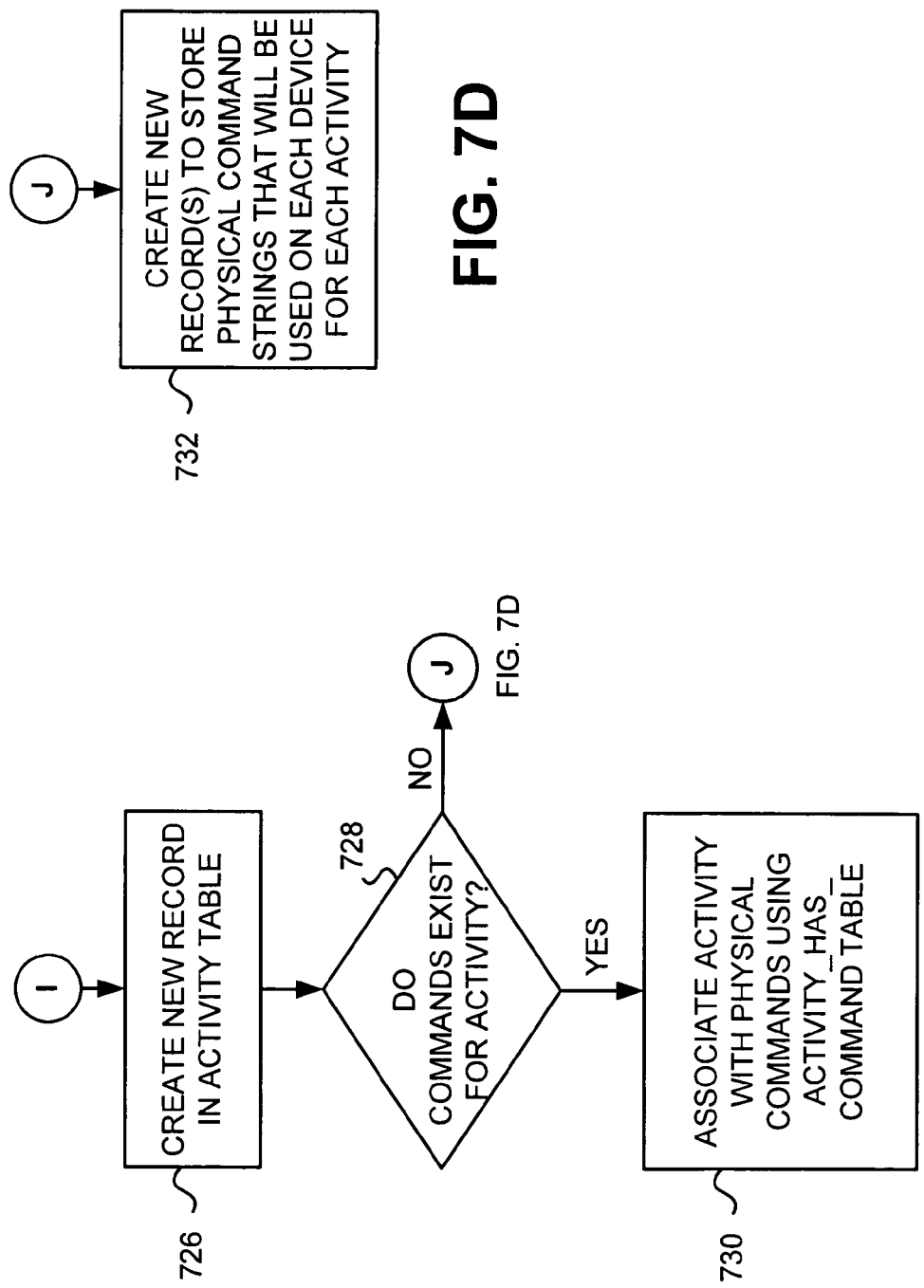

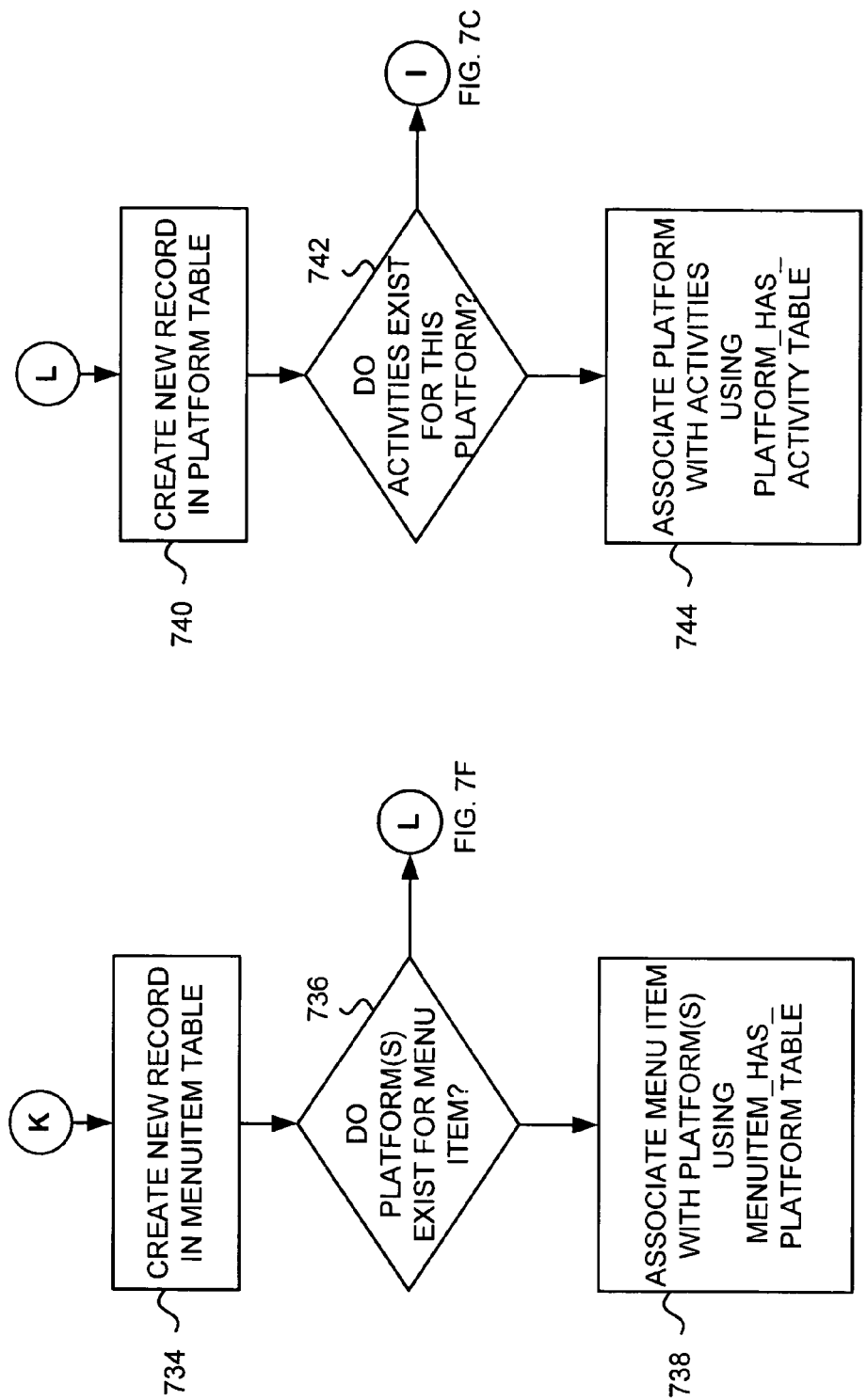

NETWORK MANAGEMENT SYSTEM

FIELD OF THE INVENTION

Implementations consistent with the principles of the invention relate generally to communications networks and, more particularly, to management of a communications network.

BACKGROUND OF THE INVENTION

Networks typically include many different types of devices. For example, a typical network may include tens to hundreds of routers, switches, gateways, servers, etc. that aid in transporting data from a source to a destination. Changing the configuration of these devices can be cumbersome task. For example, in many instances, the network devices are manually configured to reflect a change. This approach is very time consuming and error prone. In other instances, network devices are configured on a device by device basis using scripts. This approach is also time consuming and requires that the scripts be maintained by programmers.

SUMMARY OF THE INVENTION

In an implementation consistent with the principles of the invention, a system includes a relational database and processing logic. The relational database is configured to define a relationship between a group of logical activities and groups of physical commands that perform the logical activities. The processing logic is configured to receive a request to perform one logical activity of the group of logical activities, translate the one logical activity into one group of physical commands using the relational database, and cause the one logical activity to be performed on a remote device using the one group of physical commands.

In another implementation consistent with the principles of the invention, a method includes creating a first table that defines a relationship between users and profiles; creating a second table that defines a relationship between profiles and a group of logical activities, where each profile is associated with at least one of the group of logical activities that is permitted for the user to which the profile relates; creating a third table that defines a relationship between the group of logical activities and groups of physical commands that perform the group of logical activities; and using the first, second, and third tables to remotely configure a group of devices.

In still another implementation consistent with the principles of the invention, a method includes receiving a request, where the request includes information identifying a logical activity and a group of devices on which the logical activity is to be performed; translating the logical activity into a set of physical commands for each device of the group of devices using a relational database that associates logical activities and physical commands; and causing the logical activity to be performed on each of the group of devices using the sets of physical commands.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6A-6F illustrate an exemplary process for adding a new device to the database of FIG. 5 in an implementation consistent with the principles of the invention;

FIGS. 7A-7H illustrate an exemplary process for adding a new user to the database of FIG. 5 in an implementation consistent with the principles of the invention;

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention allow users to describe relationships in a relational database between a logical activity and the physical commands needed to perform that logical activity. In this way, changes can be quickly and easily implemented in a number of network devices without the need to manually configure each network device to reflect the change.

Exemplary System

Figure 1:
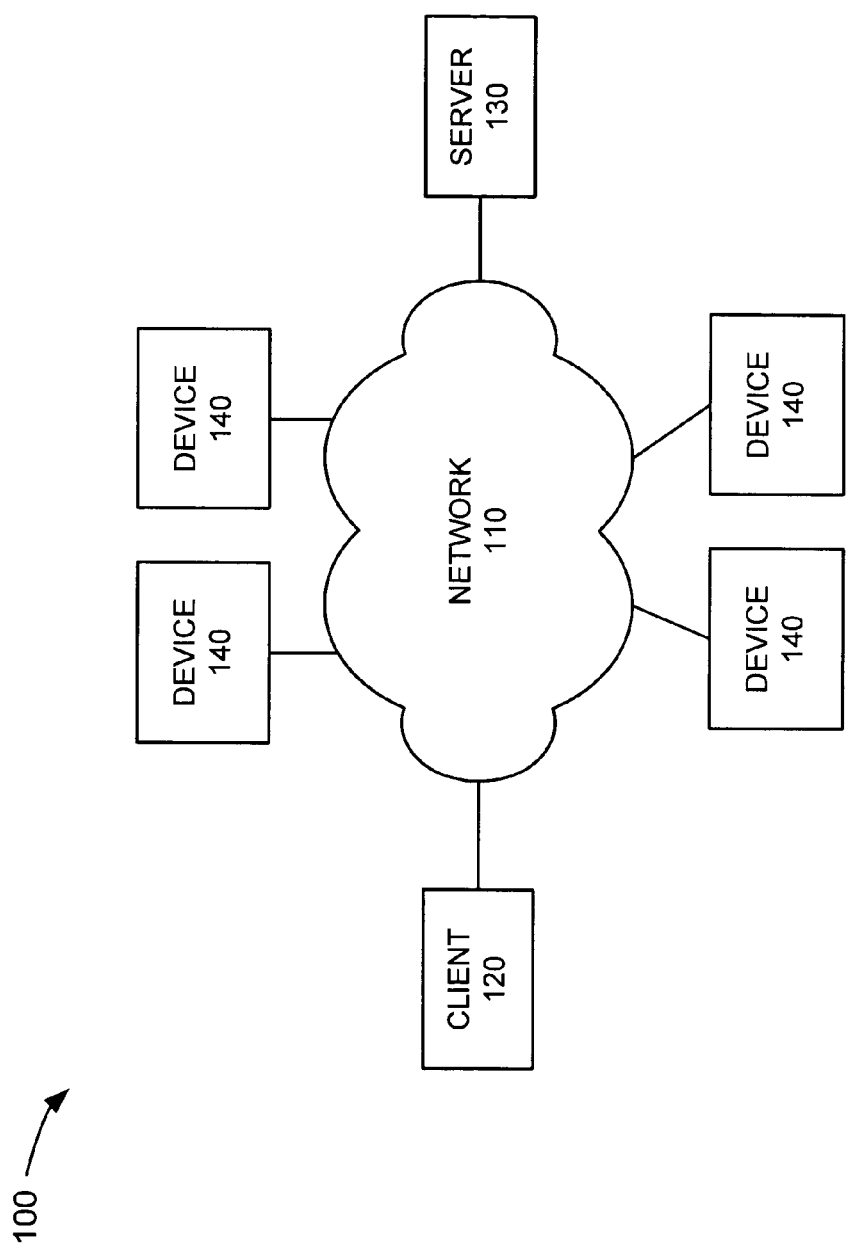
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a client 120, a server 130, and a group of devices that connect via a network 110. The number of clients, servers, and devices illustrated in FIG. 1 is provided for simplicity. In practice, a typical system could include more or fewer clients, servers, and devices than illustrated in FIG. 1.

Network 110 may include a local area network (LAN), a wide area network (WAN), a telephone network, such as the Public Switched Telephone Network (PSTN), an intranet, the Internet, or a combination of these or other networks.

Client 120 may include a device, such as a personal computer, a mainframe computer, a server, a lap top, a personal digital assistant (PDA), a wireless telephone, etc., one or more threads or processes running on these devices or other types of devices, and/or one or more objects executable by these devices. In one implementation, client 120 may allow a user to configure different types of devices, such as devices 140, on a network, such as network 110. Client 120 may connect to network 110 via any technique, such as wired, wireless, or optical connections.

Server 130 may include one or more one or more types of computer systems, such as a mainframe, minicomputer, or personal computer. In one implementation consistent with the principles of the invention, server 130 may store or be associated with a database that describes relationships between logical activities and the physical commands needed to perform those logical activities. Server 130 may receive change requests from client 120 and automatically configure devices 140 based on the change requests. Server 130 may connect to network 110 via any technique, such as wired, wireless, or optical connections.

Devices 140 may include any type of device with which server 130 can communicate. For example, devices 140 may include network devices having Internet Protocol (IP) addresses, such as servers, switches, routers, etc. Devices 140 may connect to network 110 via any technique, such as wired, wireless, or optical connections.

Exemplary Client Configuration

Figure 2:
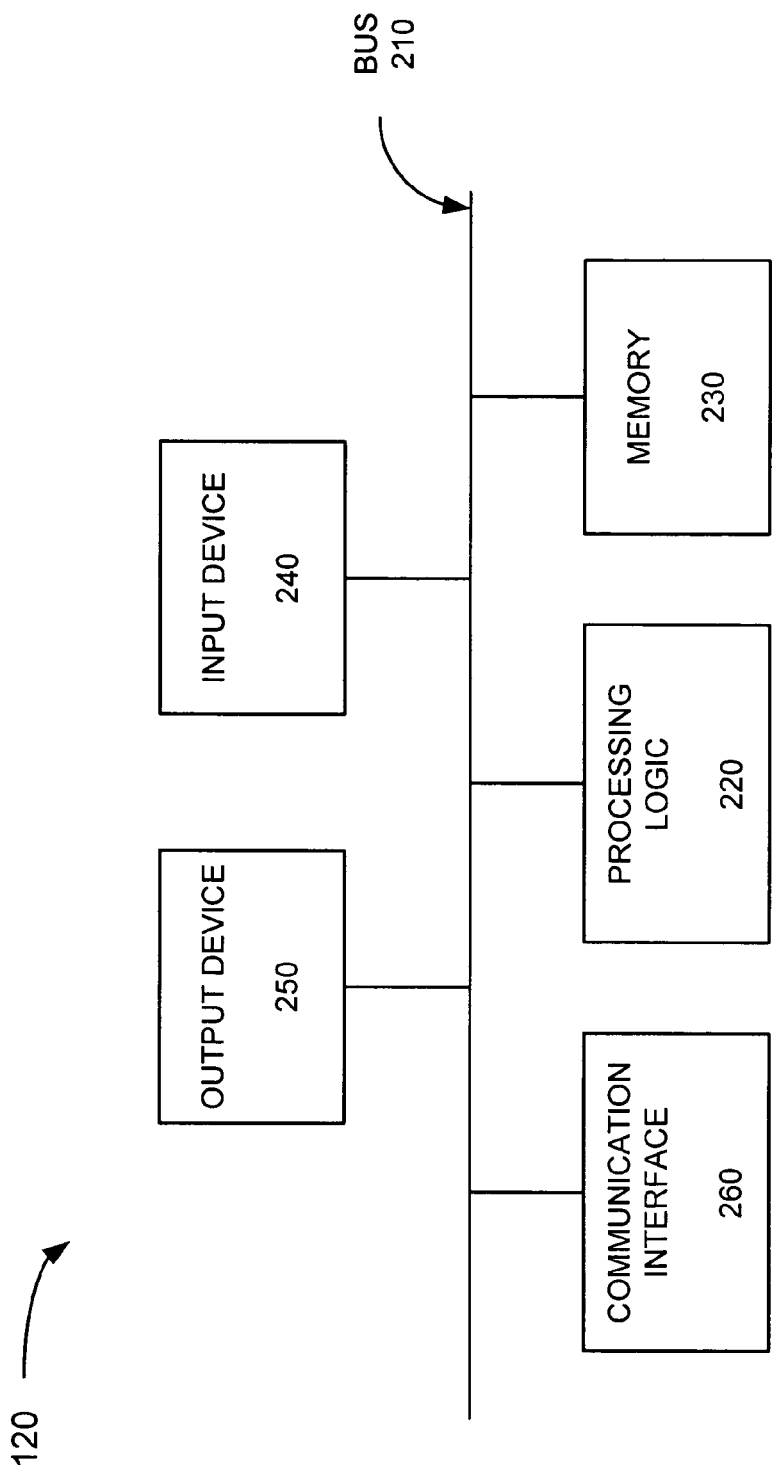
FIG. 2 illustrates an exemplary configuration of the client of FIG. 1 in an implementation consistent with the principles of the invention.

FIG. 2 illustrates an exemplary configuration of client 120 in an implementation consistent with the principles of the invention. As illustrated, client 120 may include a bus 210, processing logic 220, a memory 230, an input device 240, an output device 250, and a communication interface 260. It will be appreciated that client 120 may include other components (not shown) that aid in receiving, transmitting, and/or processing data. Moreover, it will be appreciated that other configurations are possible.

Bus 210 may permit communication among the components of client 120. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits a user to input information to client 120, such as a keyboard, a keypad, a mouse, a pen, a microphone, one or more biometric mechanisms, and the like. Output device 250 may include a device that outputs information to the user, such as a display, a printer, a speaker, etc.

Communication interface 260 may include any transceiver-like mechanism that enables client 120 to communicate with other devices and/or systems. For example, communication interface 260 may include mechanisms for communicating with server 130 via a network, such as network 110.

Figure 3:
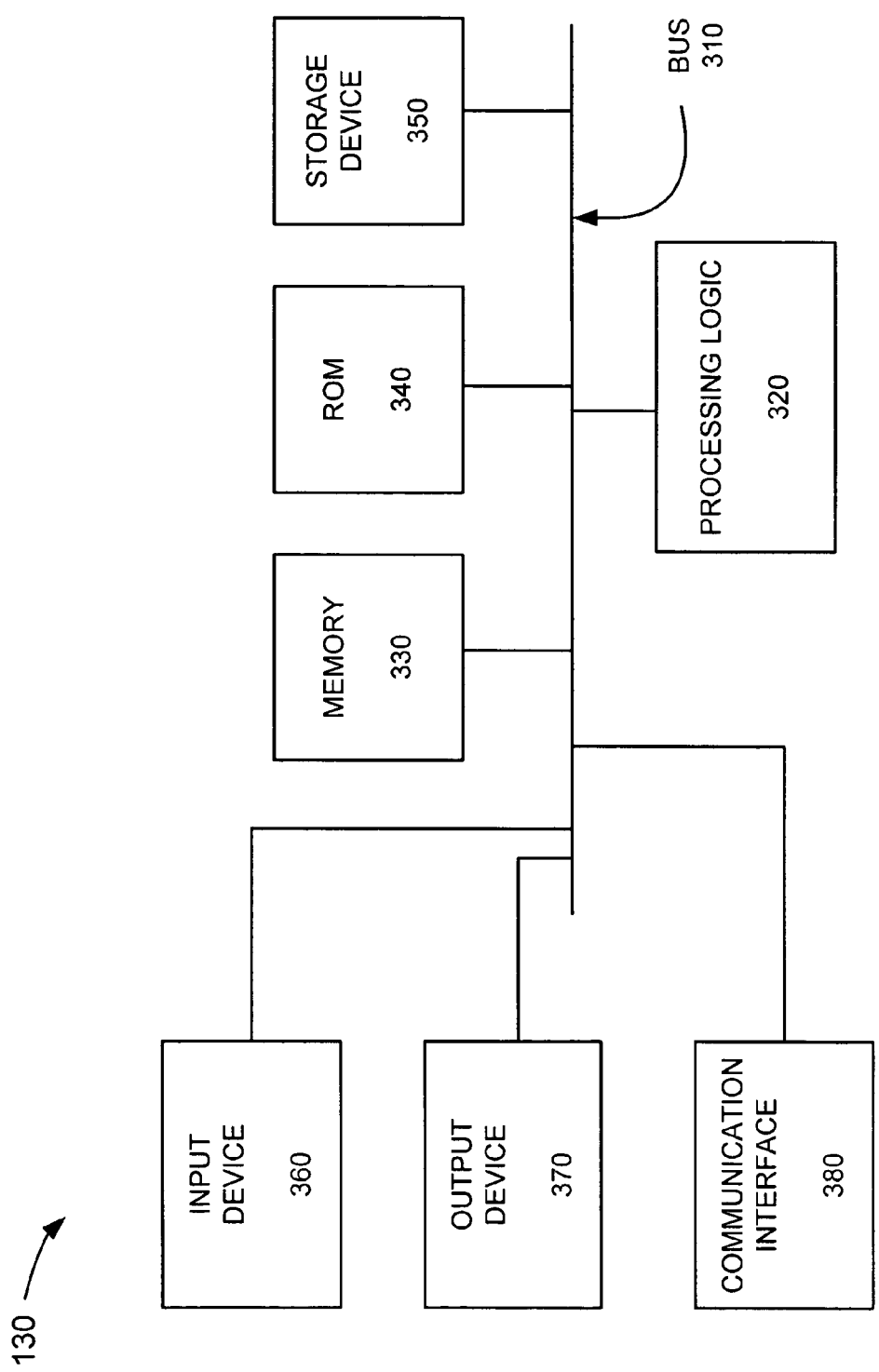
FIG. 3 illustrates an exemplary configuration of the server of FIG. 1 in an implementation consistent with the principles of the invention.

As will be described in detail below, client 120, consistent with the principles of the invention, may allow a user to configure a group of devices, such as devices 140. Client 120 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software Exemplary Server Configuration FIG. 3 illustrates an exemplary configuration of server 130 in an implementation consistent with the principles of the invention. As illustrated, server 130 may include a bus 310, processing logic 320, a memory 330, a ROM 340, a storage device 350, an input device 360, an output device 370, and a communications interface 380. It will be appreciated that server 130 may include other components (not shown) that aid in receiving, transmitting, and/or processing data.

Bus 310 may permit communication among the components of server 130. Processing logic 320 may include any type of processor or microprocessor that interprets and executes instructions. In other implementations, processing logic 320 may be implemented as or include an ASIC, FPGA, or the like. Memory 330 may include a RAM or another type of dynamic storage device that stores information and instructions for execution by processing logic 220. ROM 340 may include a ROM device and/or another type of static storage device that stores static information and instructions for the processing logic 320. Storage device 350 may include some other type of magnetic or optical recording medium and its corresponding drive for storing information and/or instructions.

Input device 360 may include a device that permits an operator to input information to server 130, such as a keyboard, a keypad, a mouse, a pen, a microphone, one or more biometric mechanisms, and the like. Output device 370 may include a device that outputs information to the operator, including a display, a printer, a speaker, etc.

Communication interface 380 may include any transceiver-like mechanism that enables server 130 to communicate with other devices and/or systems. For example, communication interface 380 may include mechanisms for communicating with another device or system via a network, such as network 110.

As will be described in detail below, server 130, consistent with the principles of the invention, may receive requests from client 120 and automatically configure devices 140 in response to the requests. Server 130 may perform these and other services in response to processing logic 320 executing software instructions contained in a computer-readable medium, such as memory 330. The software instructions may be read into memory 330 from another computer-readable medium, such as data storage device 350, or from another device via communication interface 380. The software instructions contained in memory 330 may cause processing logic 320 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 4:
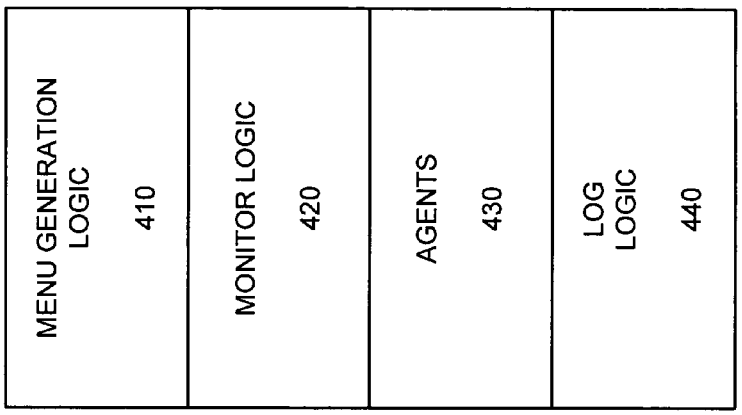
FIG. 4 illustrates an exemplary functional block diagram of the server of FIG. 1 in an implementation consistent with the principles of the invention.

FIG. 4 illustrates an exemplary functional block diagram of server 130 in an implementation consistent with the principles of the invention. As illustrated, server 130 may include menu generation logic 410, monitor logic 420, agents 430, and log logic 440. It will be appreciated that server 130 may include other functional components than are illustrated in FIG. 4 that aid in receiving, processing, and/or transmitting data.

Menu generation logic 410 may dynamically build graphical user interfaces based on a user's profile. For example, if a particular user is authorized to only perform a certain activity, menu generation logic 410 may build a graphical user interface for that user that only gives the user the option to perform that activity. Menu generation logic 410 may cause dynamically-built graphical user interfaces to be forwarded to a client, such as client 120. Menu generation logic 410 may be implemented in software and/or hardware.

Monitor logic 420 may act as the interface between server 130 and client 120. Monitor logic 420 may receive requests from client 120 and forward those requests to the appropriate agents 430 for processing. Monitor logic 420 may also forward graphical user interfaces generated by menu generation logic 410 to client 120. Monitor logic 420 may be implemented in software and/or hardware.

Agents 430 store information regarding how to communicate with each of devices 140. Agents 430 receive data from monitor logic 420 in response to received requests and cause changes to be made to devices 140 based on the received data. Agents 430 may be implemented in software and/or hardware.

Log logic 440 receives data from monitor logic 420 and agents 430 and stores this information into a log. Log logic 440 tracks all activities that are performed on devices 140. In one implementation consistent with the principles of the invention, the tracked information may include every piece of information that is transmitted to and received from devices 140 as part of performing an activity on devices 140, as well as information relating to the received activity request and the physical commands and parameters into which the received request is converted.

Figure 5:
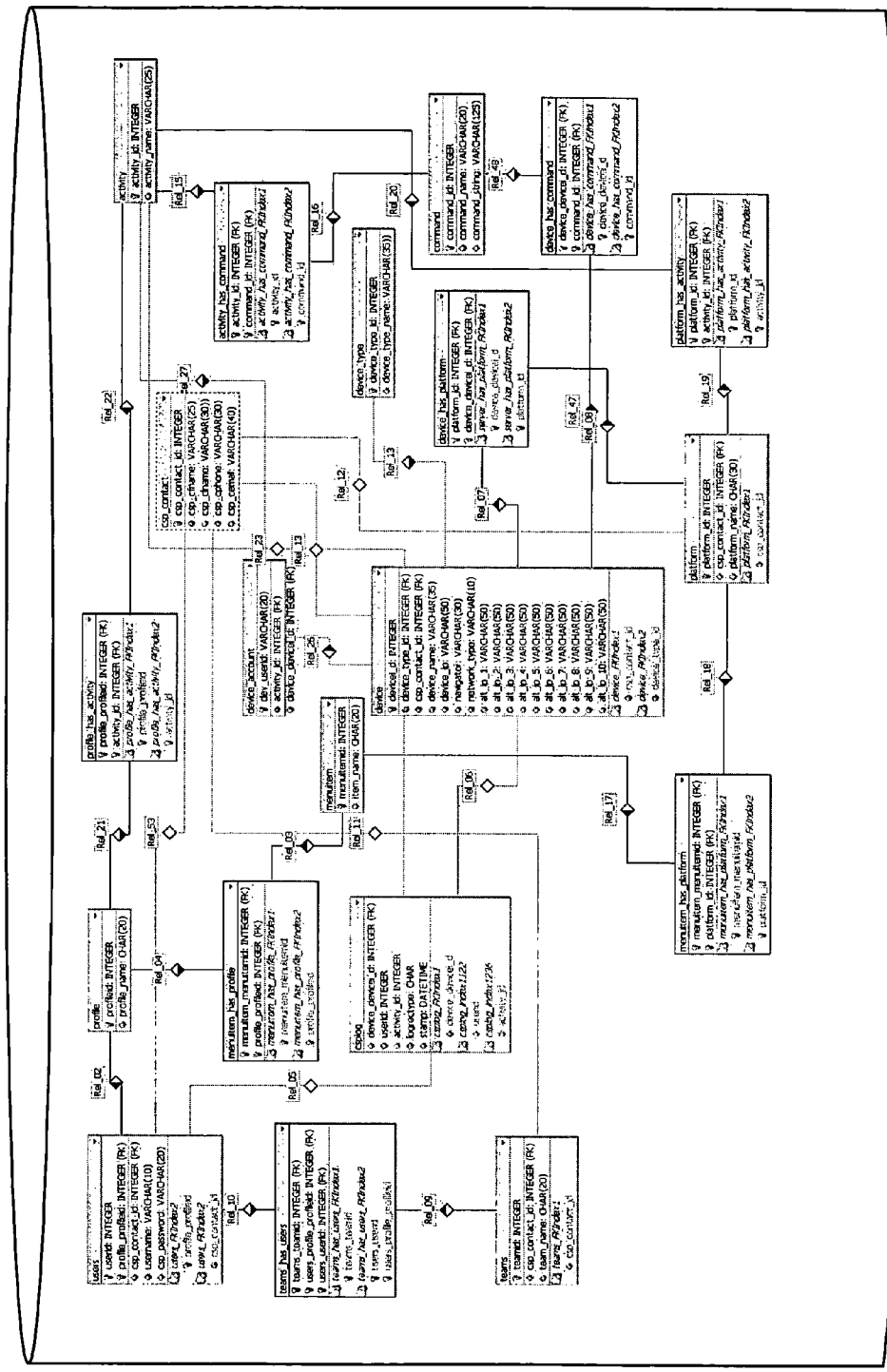
FIG. 5 illustrates an exemplary diagram of a first database that may be associated with the server of FIG. 1 in an implementation consistent with the principles of the invention.

FIG. 5 illustrates an exemplary diagram of a first database 500 that may be associated with server 130 in an implementation consistent with the principles of the invention. While only one database is described below, it will be appreciated that database 500 may consist of multiple databases stored locally at server 130 (e.g., in memory 330 or storage device 350), or stored at one or more locations throughout network 110.

In one implementation consistent with the principles of the invention, database 500 may include a group of individual tables that are configured to store information relating to users, network devices, and activities that may be performed by the users on the network devices. In one implementation, database 500 may be formed as a relational database, where each table connects to one or more other tables in a one-to-one or one-to-many manner. Each table in database 500 may include a key. A key in a relational database is a field or a combination of fields in a table that uniquely identifies a record in the table or references a record in another table. There are typically two types of keys: a primary key and a foreign key. A primary key uniquely identifies a record within a table. In other words, each record in a table is uniquely identified by one or more fields making up its primary key. A foreign key is a field or a combination of fields in one table whose values match those of a primary key of another table.

As illustrated, database 500 may include the following exemplary tables: a users table, a teams table, a team_has_users table, a profile table, a profile_has_activity table, an activity table, an activity has_command_table, a command table, a platform table, a platform_has_activity table, a device table, a device_account table, a device_has_platform table, a device_type table, a device_has_command table, a central security platform (CSP) contact table, a menuitem table, a menuitem_has profile table, a menuitem_has_platform table, and a csp_log table. The types and number of tables illustrated in FIG. 5 is provided for explanatory purposes only. It will be appreciated that database 500 may include more or fewer tables than illustrated in FIG. 5. Also, it will be appreciated that the contents of each of the tables is provided for explanatory purposes only.

The users table stores user names (username) and passwords (csp_password) for users that are authorized to access server 130. The user table may also store a user identifier (userid), which is a unique primary key identifier for a user, a foreign key that points to a specific profile in the profile table (profile_profileid) with which the user is associated, and a foreign key that points to a specific contact person in the csp_contact table (csp_contact_id) with which the user is associated.

The teams table identifies all of the teams within system 100. A team is a logical grouping of users. As an example, one team may be called a switch team, which would include those users associated with switch devices in system 100. Other examples of teams could include a data team and a midrange team that includes users associated with data devices and midrange devices in system 100. The teams table may include a unique primary key identifier for a team (teamid), a descriptive identifier for the team (team_name), and a foreign key (csp_contact_id) that points to a specific contact person within csp_contact table.

The teams_has_users table may associate a user with a team in the teams table and with a profile in the profile table. As illustrated, the teams_has_users table may store a foreign key that points to a specific team within the teams table (teams_teamsid), a foreign key that points to a specific profile within the profile table (user_profile_profileid), and a foreign key that points to a specific user within the users table (users_userid).

The profile table may store a profile for each user identified in the users table. Each profile may be associated with one or more activities that may be performed by the user with which the profile is associated. As illustrated, the profile table may store a unique primary key identifier (profileid) for a profile and a descriptive identifier (profile_name) for the profile.

The profile_has_activity table may identify activities for a profile. An activity is a logical collection of device 140 commands. Examples of activities may include "Add User," "Delete User," "Change Password," etc. The profile_has_activity may store a foreign key that points to a profile within the profile table (profile_profileid) and a foreign key that points to a specific activity within the activity table (activity_id).

The activity table stores the activities that may be performed in system 100. As indicated above, the activities may include, for example, "Add User," "Delete User," "Change Password," or other types of activities. The activity table may store a unique primary key identifier (activity_id) for a logical activity and a descriptive identifier for the logical activity (activity_name).

A logical activity may translate into one or more physical commands formulated in the native syntax of the destination device 140. The activity_has_command table provides the relationship between the commands and the activities with which the commands are associated. As illustrated, the activity_has_command table may store a foreign key that points to a specific activity within the activity table (activity_id) and a foreign key that points to a specific command within the command table (command_id).

The command table may store a list of unique native device/element command strings. Groups of commands are used to implement the logical activities described in the activity table. As illustrated, the command table may store a unique primary key identifier (command_id) for a physical command and a descriptive identifier for the command (command_name). The command table may also store a string (command_string) that is a mixture of the native operating system syntax necessary to perform a command as well as keywords parsed by server 130 with data gathered from client 120.

A platform is a classification and logical grouping of devices 140 that perform a specific function. For example, one platform may include those devices that perform Voice over Internet Protocol (VoIP). Thus, a platform may include devices of different types. For example, the VoIP platform may include edge routers, core routers, gateways, etc.

The platform table may store a unique primary key identifier for a specific platform (platform_id), a foreign key that points to a specific contact person within the csp_contact table (csp_contact_id), and a descriptive identifier for the platform (platform_name).

The platform_has_activity table describes the logical activities that are valid for the different types of platforms. The platform_has_activity table may store a foreign key that points to a specific platform within the platform table contact_id and a foreign key that points to a specific activity within the activity table (activity_id).

The device table may store information needed to connect and login to each device 140 in system 100. The device table may store a unique primary key identifier (devicei_d) for each device 140, a foreign key that points to a specific device type within the device_type table (device_type_id), a foreign key that points to a specific contact person within the csp_contact table (csp_contact_id), a user-definable name for each device 140 device_id, a network address for each device 140 device_ip, a Navigator name that is used to access each device 140 (navigator), and information identifying the type of network with which each device 140 is associated (network_type). The device table may also store a number of alternative network addresses for each device 140 (alt_ip_1 to alt_ip_10).

The device_acount table defines the accounts on devices 140 that are used for gaining access to devices 140 to perform certain activities. For example, to perform a particular activity (e.g., delete a user) on a particular device, the user that is attempting to perform that activity may need to be logged into the device using a particular account, such as administrator, superuser, root, etc. If the same user is attempting to perform a different activity on the same device (e.g., adding a user), the user may need to be logged into the device using a different account. Thus, the device_account table may associate an account with each activity performed on a device. As illustrated, the device_account table may store a unique primary key identifier (dev_userid) for the account, a foreign key that points to a specific activity within the activity table (activity_id), and a foreign key that points to a specific device in the device table (device_devicei_d).

The device_has_platform table describes the relationship between a platform and the devices with which the platform is associated. As illustrated, the device_has_platform table may store a foreign key that points to a specific platform within the platform table (platform_id) and a foreign key that points to a specific device in the device table (device_devicei_d).

The device_type table describes a logical type of device within system 100. Examples of device types may include Unix, switch, digital cross connect (DXC), etc. As illustrated, the device_type table may store a unique primary key identifier for a device type (device_type_id) and a descriptive name for the device type (device_type_name).

The device_has_command table describes a relationship between devices 140 and commands. As illustrated, the device_has_command table may store a foreign key that points to a specific device within the device table (device_devicei_d) and a foreign key that points to a specific command in the command table (command_id).

The csp_contact table may store information to contact a person responsible for a resource, such as a platform, a device, a team, etc. As illustrated, the csp_contact table may store a unique primary key identifier for a contact person (csp_contact_id), a first name for the contact person (csp_cfname), a last name for the contact person (csp_clname), a telephone number for the contact person (csp_cphone), and an e-mail address for the contact person (csp_cemail).

As will be described in greater detail below, server 130 may dynamically construct a graphical user interface that includes a menu for the user of client 120 based on the user's profile in the profile table. A menu item may be an item on a toolbar or other location within the graphical user interface on client 120, a field in the graphical user interface provided to client 120, etc. In one implementation consistent with the principles of the invention, each menu item may correspond to a different device type, a different platform, a different activity, or other element within database 500. As illustrated, the menuitem table may store a unique primary key identifier for a menu item (menuitemid) and a descriptive name for the menu item (item_name).

The menuitem_has_profile table describes the relationship between a particular menu item and a particular profile in the profile table. As illustrated, menuitem_has_profile table may store a foreign key that points to a specific menu item within the menuitem table (menuitem_menuitemid) and a foreign key that points to a specific profile within the profile table (profile_profileid).

The menuitem_has_platform table describes the relationship between a particular menu item and a particular platform in the platform table. As illustrated, menuitem_has_platform table may store a foreign key that points to a specific menu item within the menuitem table (menuitem_menuitemid) and a foreign key that points to a specific platform within the platform table (platform_id).

The csplog table records information identifying the activities that are performed on devices 140, information identifying devices 140 on which the activities are performed, and information identifying the users that performed those activities. As illustrated, the csplog table may store a foreign key that points to a specific device in the device table (device_devicei_d), a foreign key that points to a specific user in the users table (userid), a foreign key that points to a specific activity in the activity table (activity_id), and a timestamp (stamp) that indicates when the record was created. The csplog table may also store information identifying the type of log entry (logrectype), such as a start of a transaction, an end of a transaction, or other information regarding the transaction. Although not shown in FIG. 5, the csplog table may also store a transaction identifier that uniquely identifies each transaction performed by a user in system 100.

Exemplary Processing

FIGS. 6A-6F illustrate an exemplary process for adding a new device 140 to database 500 in an implementation consistent with the principles of the invention. It will be assumed hereinafter that the processing described in FIGS. 6A-6F is performed by a user at a client, such as client 120. In alternative implementations consistent with the principles of the invention, a user may perform the acts described below at server 130 or another device in system 100.

Processing may begin by creating a record for the new device 140 in the device table of database 500 (act 602). In one implementation consistent with the principles of the invention, a graphical user interface may be provided to the user at client 120 that allows the user to specify that a new record is to be created in the device table. The user may then specify an identifier (devicei_d) for new device 140. The identifier may correspond to a unique serial number associated with new device 140 or some other unique number or character sequence. In an alternative implementation consistent with the principles of the invention, an identifier (devicei_d) may be automatically generated for new device 140 (e.g., by server 130).

Other information regarding new device 140 may also be stored in the new record. For example, the user may enter a descriptive name for new device 140 device_id, a network address for new device 140 device_ip, a Navigator name that is used to access new device 140 (navigator), information identifying the type of network with which new device 140 is associated (network_type), and possibly one or more alternative network addresses for new device 140 (alt_ip_1 to alt_ip_10).

It may be determined whether a device type already exists for new device 140 (act 604). If a device type does not already exist for new device 140, a new record may be created in the device_type table (act 622) (FIG. 6B). To create the new record in the device_type table, the user may specify an identifier (device_type_id) for the new device type in the device_type table. The identifier may include a unique character sequence. In an alternative implementation consistent with the principles of the invention, an identifier (device_type_id) may be automatically generated for the new device type (e.g., by server 130). In addition to the device type identifier, a descriptive name may be specified for the new device type (device_type_name).

Returning to FIG. 6A, if a device type already exists for new device 140 (act 604), new device 140 may be associated with the existing device type (act 606). For example, in one implementation, the identifier of the device type (device_type_id) may be associated with the identifier for new device 140 (devicei_d) in the device table.

It may be determined whether new device 140 is associated with an existing platform (act 608). If new device 140 is not associated with an existing platform, a new record may be created in the platform table (act 624) (FIG. 6C). To create the new record in the platform table, the user may specify an identifier (platform_id) for the new platform in the platform table. The identifier may include a unique character sequence. In an alternative implementation consistent with the principles of the invention, an identifier platform_id may be automatically generated for the new platform (e.g., by server 130). In addition to the platform identifier, a descriptive name may be specified for the new platform (platform_name).

It may be determined whether the activities that may be performed on this platform have been pre-defined (act 626). If so, the new platform may be associated with the pre-defined activities (act 628). In one implementation consistent with the principles of the invention, the new platform may be associated with the pre-defined activities by associating the new platform's identifier (platformn_id) with the identifiers for the pre-defined activities (activity_id) in the platform_has_activity table.

Figure 6A:
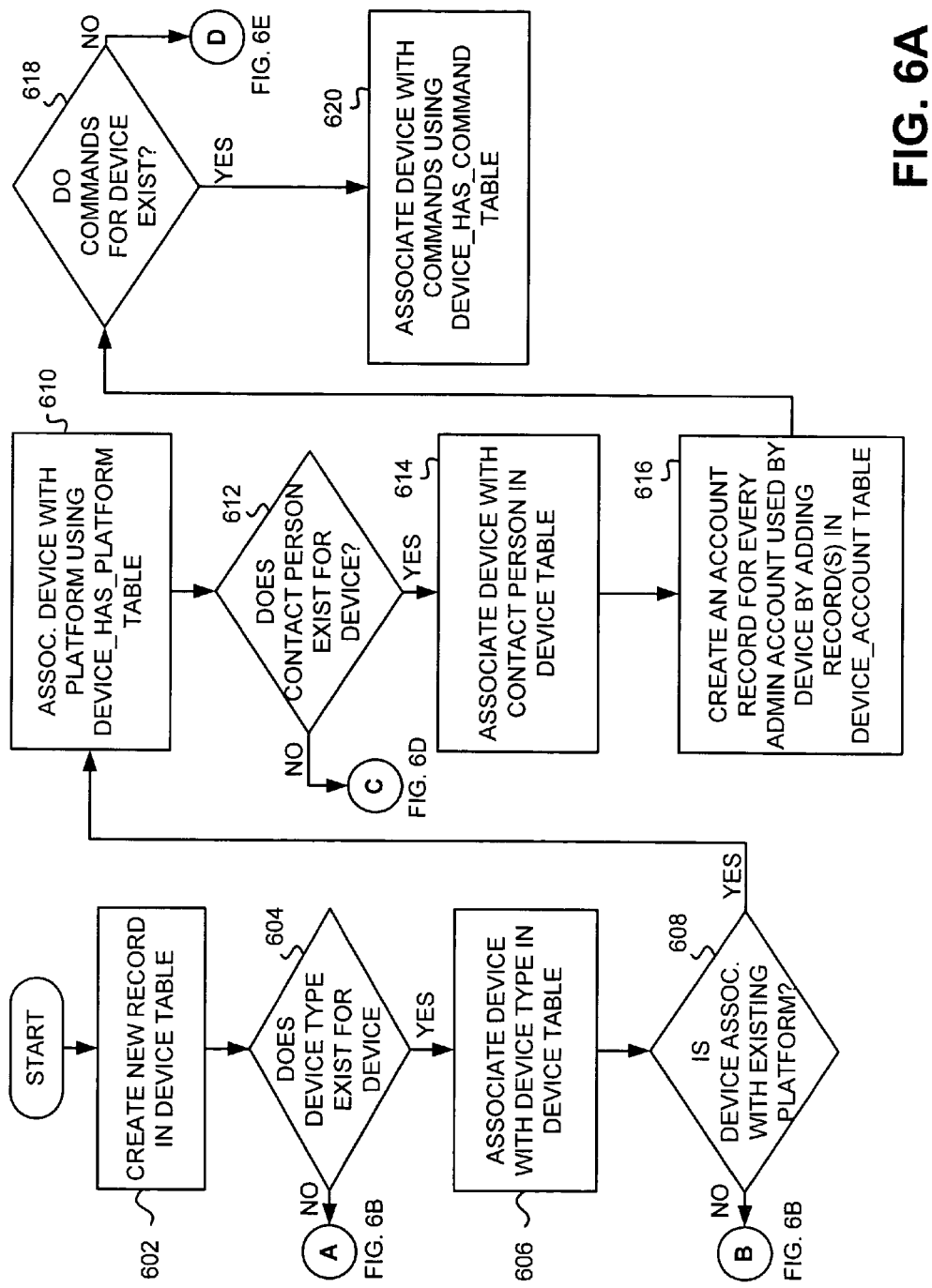
Figure 6F:
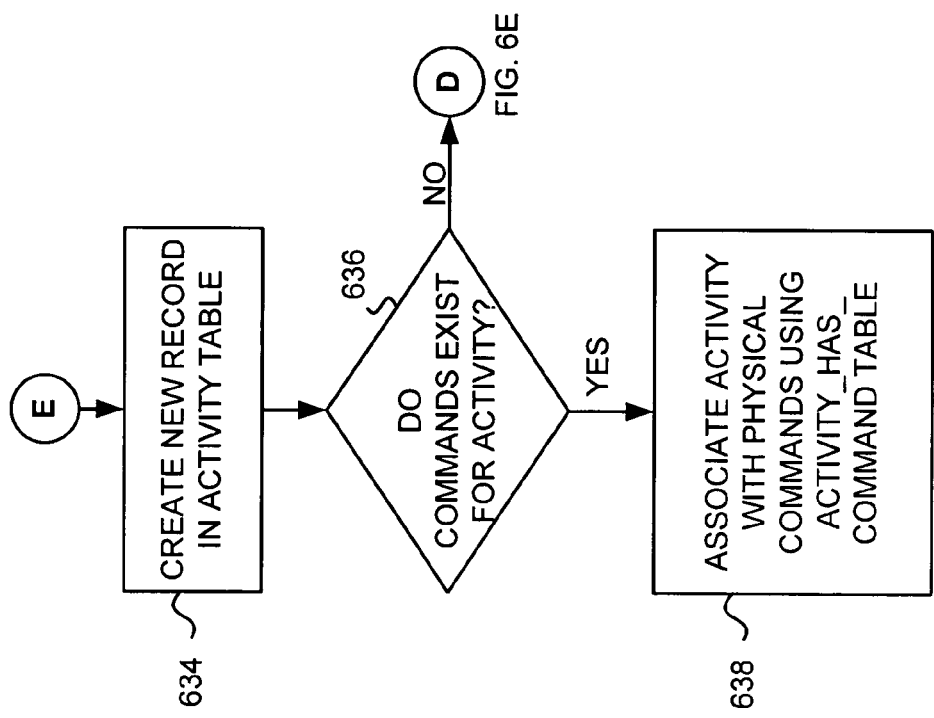

If, on the other hand, an activity that can be performed on the platform has not been pre-defined (act 626), a new record may be created in the activity table (act 634) (FIG. 6F). To create the new record in the activity table, the user may specify an identifier (activity_id) for the new activity in the activity table. The identifier may include a unique character sequence. In an alternative implementation consistent with the principles of the invention, an identifier (activity_id) may be automatically generated for the new activity (e.g., by server 130). In addition to the activity identifier, a descriptive name may be specified for the new activity (activity_name).

It may be determined whether the physical command strings that will be used to perform the new activity on new device 140 exist (act 636). If so, the new activity may be associated with the pre-defined commands (act 638). In one implementation consistent with the principles of the invention, the new activity may be associated with the pre-defined commands by associating the new activity's identifier (activity_id) with the identifiers for the pre-defined commands (command_id) in the activity_has_command table.

If, on the other hand, the physical command strings that will be used to perform the new activity on new device 140 do not already exist (act 636), one or more new records may be created in the command table (act 632) (FIG. 6E). To create the new record(s) in the command table, the user may associate a physical command string (command_string) with each new command. In one implementation consistent with the principles of the invention, the physical command string may be in the native syntax of new device 140. Moreover, the physical command string may include locations for variable substitution, as may be required to perform the new command. In addition to the command string, a descriptive name may be specified for each new command (command_name).

Returning to FIG. 6A, if new device 140 is associated with an existing platform (act 608), new device 140 may be associated with the existing platform at server 130 (act 610). For example, in one implementation, the identifier of the platform contact_id may be associated with the identifier for new device 140 (devicei_d) in the device_has_platform table.

It may be determined whether a contact person for new device 140 already exists (act 612). If new device 140 is not associated with an existing contact person, a new record may be created in the csp_contact table (act 630) (FIG. 6D). To create the new record in the csp_contact table, the user may specify an identifier (csp_contact_id) for the new contact person in the csp_contact table. The identifier may include a unique character sequence. In an alternative implementation consistent with the principles of the invention, an identifier (csp_contact_id) may be automatically generated for the new contact person (e.g., by server 130). In addition to the contact person identifier, the contact person's first and last names (csp_cfname, csp_clname) and contact information may be specified, such as, for example, a telephone number (csp_cphone) and/or e-mail address (csp_cemail).

Returning to FIG. 6A, if a contact person already exists for new device 140 (act 612), new device 140 may be associated with the contact person (act 614). For example, in one implementation, the identifier of the contact person (csp_contact_id) may be associated with the identifier for new device 140 (devicei_d) in the device table.

A new account record may be created for each administrative account used by new device 140 (act 616). In one implementation, a new account record may be created in the device_account table by specifying an identifier (device_userid) for the new device account in the device_account table. The identifier may include a unique character sequence. In an alternative implementation consistent with the principles of the invention, an identifier (device_userid) may be automatically generated for the new device account (e.g., by server 130). In addition to the device account identifier, an activity identifier (activity_id) and the identifier of new device 140 device_id may be specified.

It may be determined whether the commands that can be performed on new device 140 already exist (act 618). If the commands already exist, new device 140 may be associated with the commands (act 620). For example, in one implementation, the identifier of each command (command_id) may be associated with the identifier for new device 140 (devicei_d) in the device_has_command table.

If, on the other hand, one or more of the commands that can be performed on new device 140 do not already exist (act 618), one or more new records may be created in the command table for the commands (act 632) (FIG. 6E). To create the new record(s) in the command table, the user may associate a physical command string (command_string) with each new command. In one implementation consistent with the principles of the invention, the physical command string may be in the native syntax of new device 140. Moreover, the physical command string may include locations for variable substitution, as may be required to perform the new command. In addition to the command string, a descriptive name may be specified for each new command (command_name).

In this way, database 500 may be populated with devices 140 that are part of system 100. Moreover, the relationship between logical activities that may be performed on these devices 140 and the physical commands in the native syntax of devices 140 needed to perform the logical activities may be defined.

FIGS. 7A-7H illustrate an exemplary process for adding a new user to database 500 in an implementation consistent with the principles of the invention. As described above, users include those persons permitted to perform activities on devices 140. It will be assumed hereinafter that the processing described in FIGS. 7A-7H is performed by a user (called "an individual" in the description of FIGS. 7A-7H so as distinguish this user from the new user being added to database 500) at a client, such as client 120. In alternative implementations consistent with the principles of the invention, an individual may perform the acts described below at server 130 or another device in system 100.

Processing may begin by creating a record for the new user in the users table of database 500 (act 702). In one implementation consistent with the principles of the invention, a graphical user interface may be provided to the individual at client 120 that allows the individual to specify that a new record is to be created in the users table. The individual may then specify an identifier (userid) for the new user. The identifier may a unique character sequence. In an alternative implementation consistent with the principles of the invention, an identifier (userid) may be automatically generated for the new user (e.g., by server 130).

Other information regarding the new user may also be stored in the new record. For example, the individual may enter a descriptive name for the new user (username) and a password for the new user (csp_password).

Figure 7A:
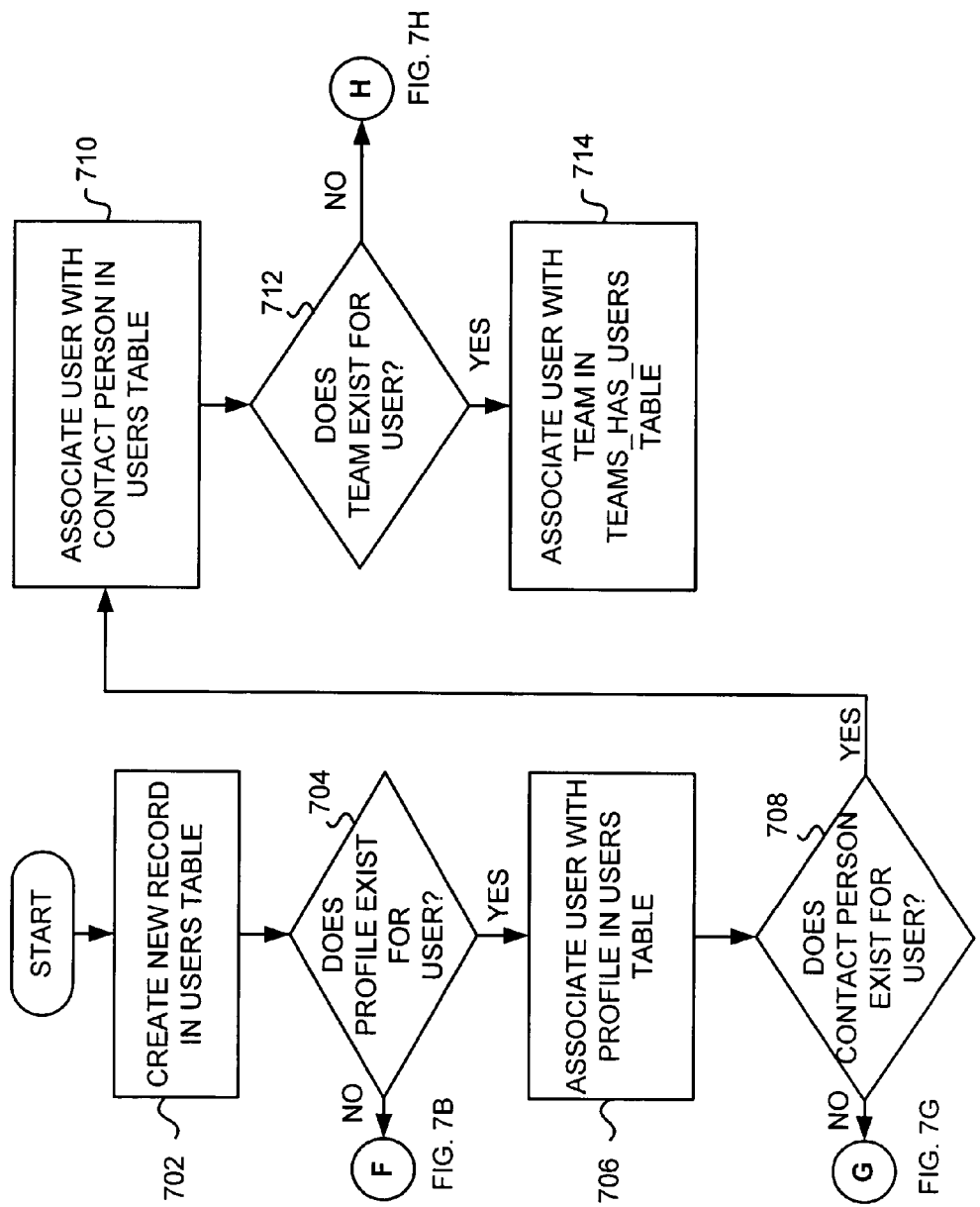
Figure 7B:
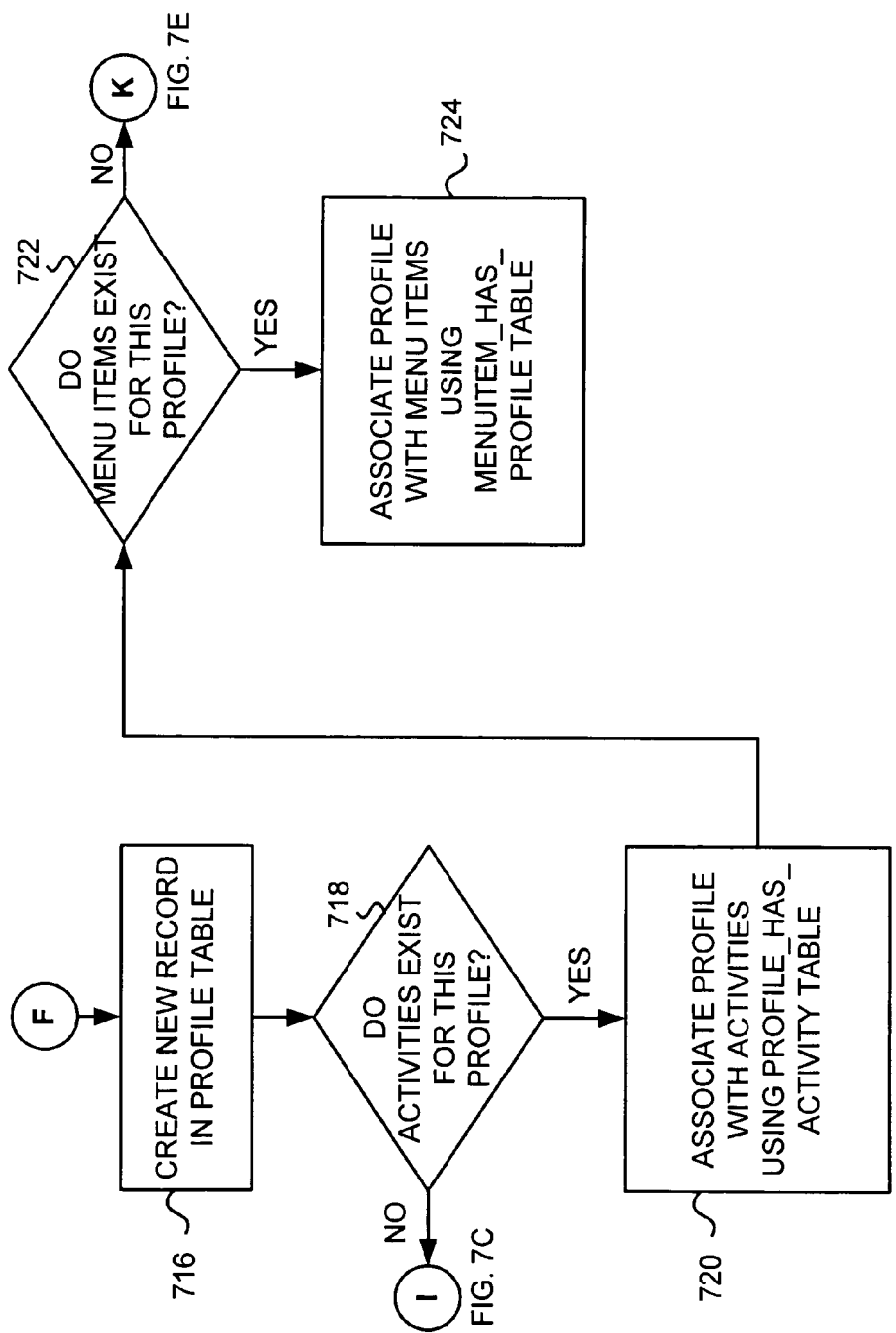

It may be determined whether a profile already exists for the new user (act 704). A profile may already exist for the new user in those situations, for example, where the new user's access privileges are to be identical to the access privileges of another user, such as a co-worker. If a profile does not already exist for the new user, a new record may be created in the profile table (act 716) (FIG. 7B). To create the new record in the profile table, the individual may specify an identifier (profileid) for the new profile in the profile table. The identifier may include a unique character sequence. In an alternative implementation consistent with the principles of the invention, an identifier (profileid) may be automatically generated for the new profile (e.g., by server 130). In addition to the profile identifier, a descriptive name may be specified for the new profile (profile_name).

It may be determined whether the activities that are permitted to be performed for the new profile have been pre-defined (act 718). If an activity that is permitted to be performed for the new profile has not be pre-defined (act 718), a new record may be created in the activity table (act 726) (FIG. 7C). To create the new record in the activity table, the individual may specify an identifier (activity_id) for the new activity in the activity table. The identifier may include a unique character sequence. In an alternative implementation consistent with the principles of the invention, an identifier (activity_id) may be automatically generated for the new activity (e.g., by server 130). In addition to the activity identifier, a descriptive name may be specified for the new activity (activity_name).

It may be determined whether the physical command strings that will be used to perform the new activity exist (act 728). If so, the new activity may be associated with the pre-defined commands (act 730). In one implementation consistent with the principles of the invention, the new activity may be associated with the pre-defined commands by associating the new activity's identifier (activity_id) with the identifiers for the pre-defined commands (command_id) in the activity_has_command table.

If, on the other hand, the physical command strings that will be used to perform the new activity do not already exist (act 728), one or more new records may be created in the command table (act 732) (FIG. 7D). To create the new record(s) in the command table, the individual may associate a physical command string (command_string) with each new command. As set forth above, the physical command string may be in the native syntax of each device on which the command may be performed. Moreover, the physical command string may include locations for variable substitution, as may be required to perform the new command. In addition to the command string, a descriptive name may be specified for each new command (command_name).

Returning to FIG. 7B, if the activities that are permitted to be performed for the new profile already exist (act 718), the new profile may be associated with the pre-defined activities (act 720). In one implementation consistent with the principles of the invention, the new profile may be associated with the pre-defined activities by associating the new profile's identifier (profileid) with the identifiers for the pre-defined activities (activity_id) in the profile_has_activity table.

It may be determined whether one or more menu items for the new profile have been pre-defined (act 722). If a menu item for the new profile has not been pre-defined (act 722), a new record may be created in the menuitem table (act 734) (FIG. 7E). To create the new record in the menuitem table, the individual may specify an identifier (menuitemid) for the new menu item in the menuitem table. The identifier may include a unique character sequence. In an alternative implementation consistent with the principles of the invention, an identifier (menuitemid) may be automatically generated for the new menu item (e.g., by server 130). In addition to the menu item identifier, a descriptive name may be specified for the new menu item (item_name).

It may be determined whether a platform exists for the new menu item (act 736). If so, the new menu item may be associated with the platform (act 738). In one implementation consistent with the principles of the invention, the new menu item may be associated with the platform by associating the new menu item's identifier (menuitemid) with the identifiers for the platforms (platform_id) in the menuitem_has_platform table.

If, on the other hand, a platform does not exist for the new menu item (act 736), a new record may be created in the platform table (act 740) (FIG. 7F). To create the new record in the platform table, the individual may specify an identifier (platform_id) for the new platform in the platform table. The identifier may include a unique character sequence. In an alternative implementation consistent with the principles of the invention, an identifier contact_id may be automatically generated for the new platform (e.g., by server 130). In addition to the platform identifier, a descriptive name may be specified for the new platform (platform_name).

It may be determined whether the activities that may be performed on this platform have been pre-defined (act 742). If so, the new platform may be associated with the pre-defined activities (act 744). In one implementation consistent with the principles of the invention, the new platform may be associated with the pre-defined activities by associating the new platform's identifier (platform_id) with the identifiers for the pre-defined activities (activity_id) in the platform_has_activity table.

It may be determined whether the physical command strings that will be used to perform the new activity exist (act 728). If so, the new activity may be associated with the pre-defined commands (act 730). In one implementation consistent with the principles of the invention, the new activity may be associated with the pre-defined commands by associating the new activity's identifier (activity_id) with the identifiers for the pre-defined commands (command_id) in the activity_has_command table.

If, on the other hand, the physical command strings that will be used to perform the new activity do not already exist (act 728), one or more new records may be created in the command table (act 732) (FIG. 7D). To create the new record(s) in the command table, the individual may associate a physical command string (command_string) with each new command. As set forth above, the physical command string may be in the native syntax of each device on which the command may be performed. Moreover, the physical command string may include locations for variable substitution, as may be required to perform the new command. In addition to the command string, a descriptive name may be specified for each new command (command_name).

Returning to FIG. 7B, if a menu item for the new profile has been pre-defined (act 722), the new profile may be associated with the menu item (act 724). In one implementation consistent with the principles of the invention, the new profile may be associated with the menu item by associating the profile's identifier (profileid) with the identifier for the menu item (menuitemid) in the menuitem_has_profile table.

Returning to FIG. 7A, if a profile already exists for the new user, the profile may be associated with the new user (act 706). In one implementation consistent with the principles of the invention, the profile may be associated with the new user by associating the profile's identifier (profileid) with the identifier for the new user (userid) in the users table.

It may be determined whether the new user is associated with an existing contact person (act 708). If the new user is not associated with an existing contact person, a new record may be created for the contact person (act 746) (FIG. 7G). To create the new record, the individual may specify an identifier (csp_contact_id) for the new contact person in the csp_contact table. The identifier may include a unique character sequence. In an alternative implementation consistent with the principles of the invention, an identifier (csp_contact_id) may be automatically generated for the new contact person (e.g., by server 130). In addition to the contact person identifier, the contact person's first and last names (csp_cfname, csp_clname) and contact information may be specified, such as, for example, a telephone number (csp_cphone) and/or e-mail address (csp_cemail).

Returning to FIG. 7A, if the new user is associated with an existing contact person (act 708), the new user may be associated with the contact person (act 710). For example, in one implementation, the identifier of the contact person (csp_contact_id) may be associated with the identifier for the new user (userid) in the users table.

It may be determined whether the new user is associated with an existing team (act 712). If so, the new user may be associated with the team at server 130 (act 714). For example, in one implementation, the identifier of the team (teamid) may be associated with the identifier for the new user (userid) in the teams_has_users table.

Figure 7H:
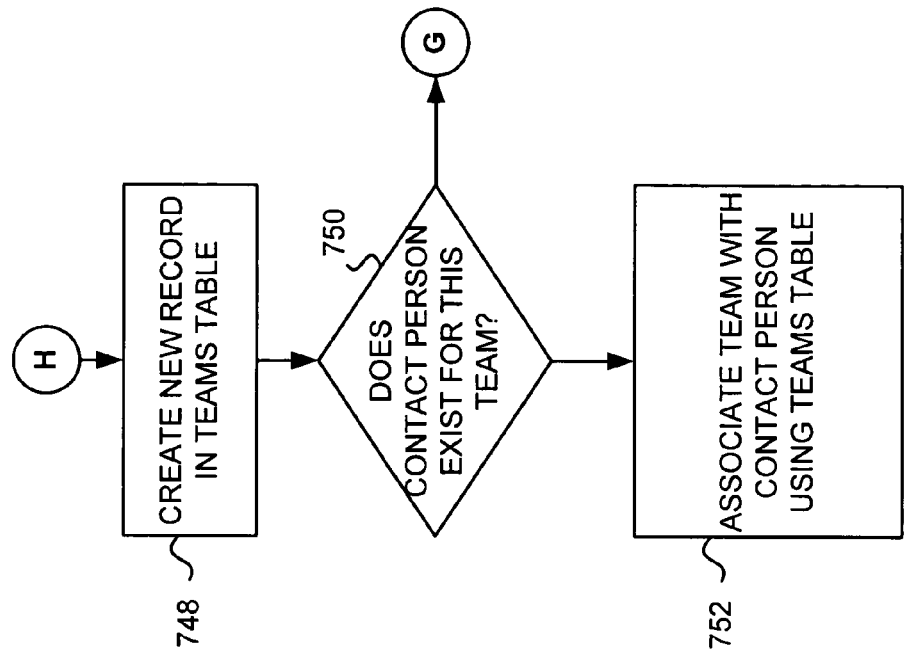
Figure 7G:
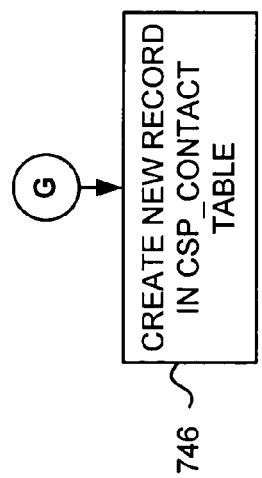

If the new user is not associated with an existing team, a new record may be created for the team (act 748) (FIG. 7H). To create the new record, the individual may specify an identifier (teamid) for the new team in the teams table. The identifier may include a unique character sequence. In an alternative implementation consistent with the principles of the invention, an identifier (teamid) may be automatically generated for the new contact person (e.g., by server 130). In addition to the team identifier, the descriptive name may be specified for the team (team_name).

It may be determined whether the new team is associated with an existing contact person (act 750). If so, the team may be associated with the contact person (act 752). For example, in one implementation, the identifier of the contact person (csp_contact_id) may be associated with the identifier for the new team (teamid) in the teams table.

If the new team is not associated with an existing contact person, a new record may be created in csp_contact table (act 746) (FIG. 7G). To create the new record, the individual may specify an identifier (csp_contact_id) for the new contact person in the csp_contact table. The identifier may include a unique character sequence. In an alternative implementation consistent with the principles of the invention, an identifier (csp_contact_id) may be automatically generated for the new contact person (e.g., by server 130). In addition to the contact person identifier, the contact person's first and last names (csp_cfname, csp_clname) and contact information may be specified, such as, for example, a telephone number (csp_cphone) and/or e-mail address (csp_cemail).

In this way, database 500 may be populated with new users. Each user may be associated with a profile, which, among other things, defines the logical activities that each new user is permitted to perform. Also, each user's profile may be associated with one or more menu items that may be used for dynamically constructing graphical user interfaces for each user.

Figure 8:
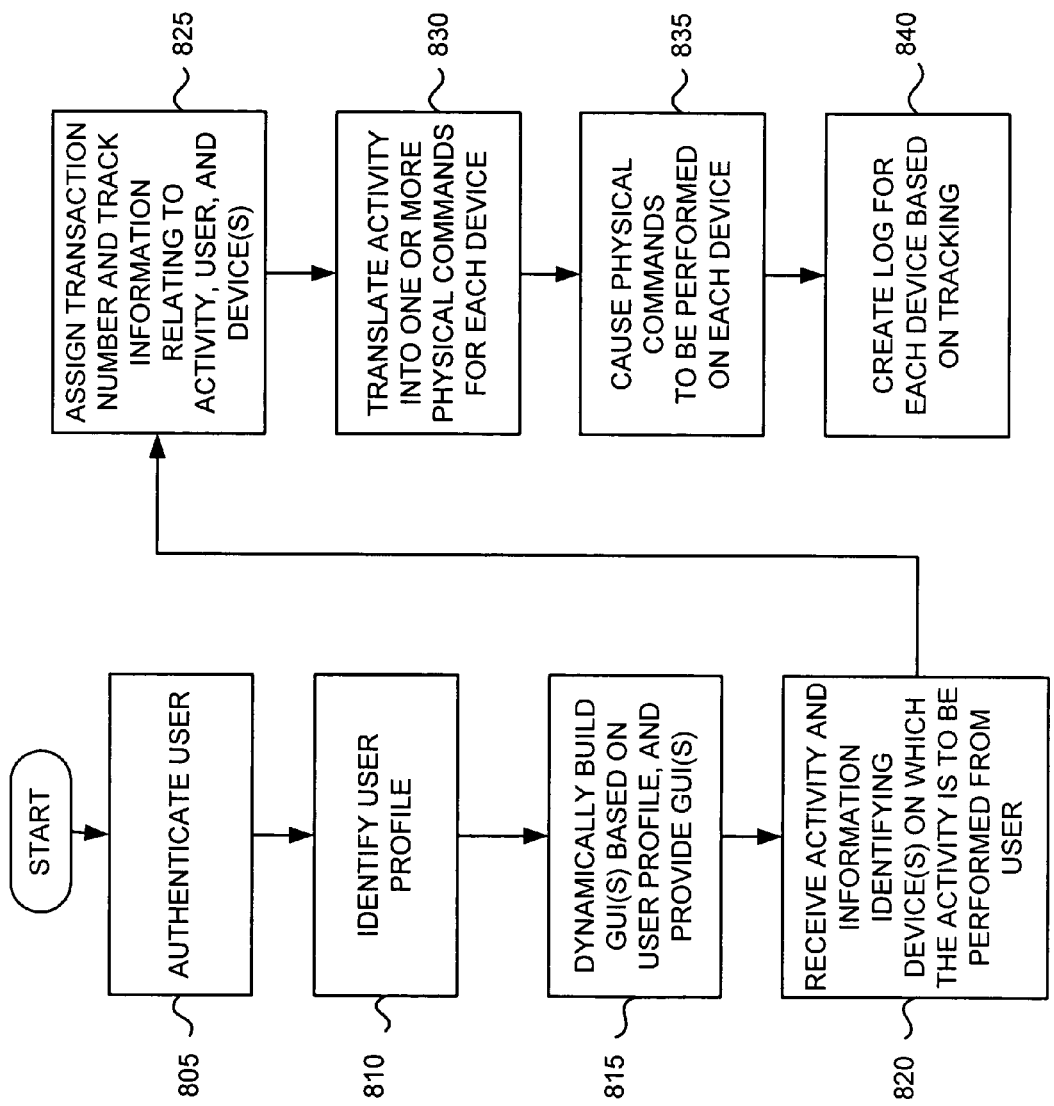
FIG. 8 illustrates an exemplary process for performing an activity on a device of FIG. 1 in an implementation consistent with the principles of the invention.
Figure 9:
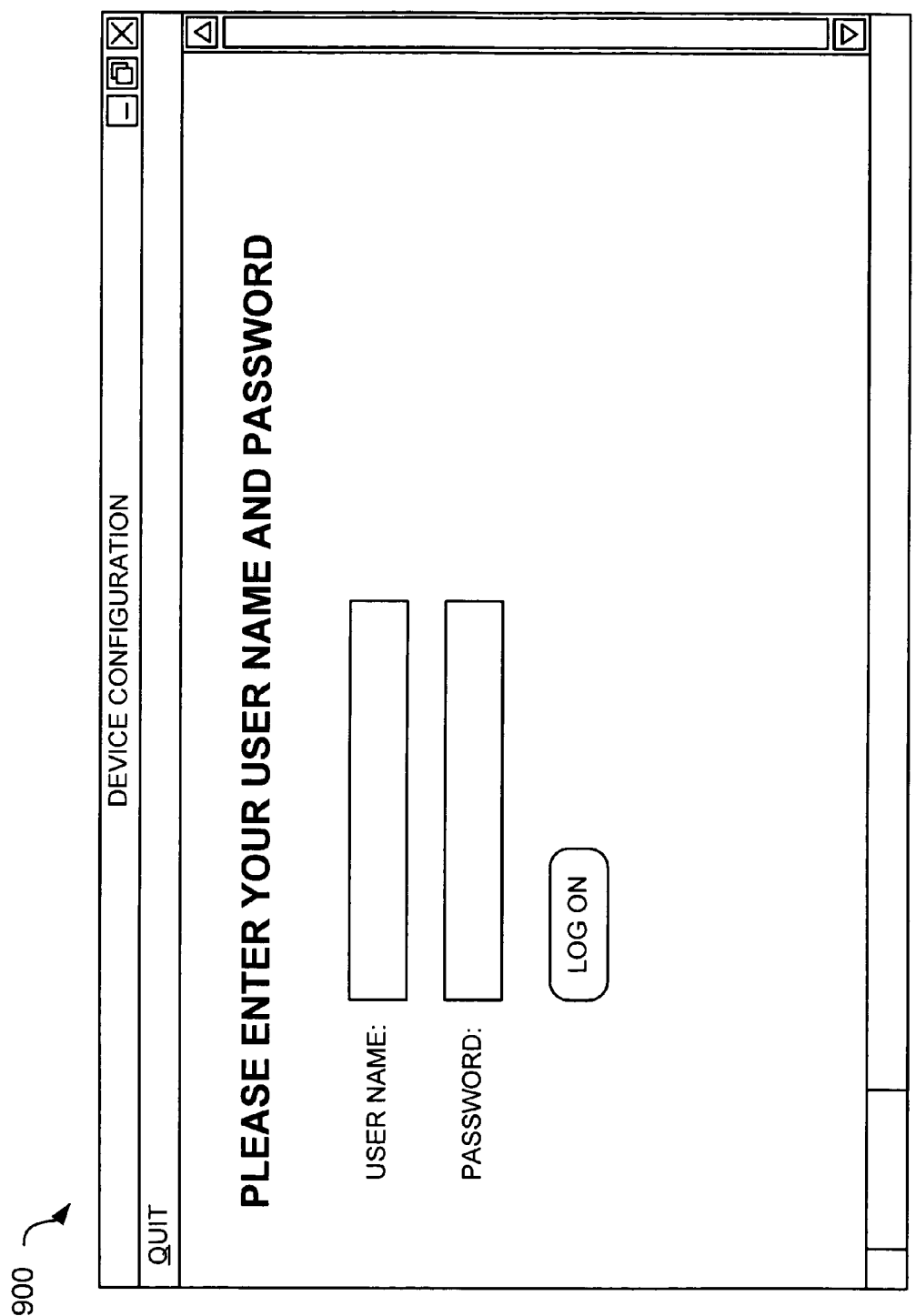
FIG. 9 illustrates an exemplary graphical user interface that may be provided to a user in an implementation consistent with the principles of the invention.

FIG. 8 illustrates an exemplary process for performing an activity on a device 140 in an implementation consistent with the principles of the invention. Processing may begin with server 130 authenticating a user (act 805). For example, server 130 may cause a graphical user interface to be presented to the user at a client, such as client 120. FIG. 9 illustrates an exemplary graphical user interface 900 that may be provided to a user in an implementation consistent with the principles of the invention. As illustrated, graphical user interface 900 may allow the user to enter a user name and password. By pressing the log on button, the user may cause the entered user name and password to be transmitted to server 130. Server 130 may authenticate the user by comparing the user name and password to user name and password combinations that have been stored in the users table of database 500.

If the user name and password match a stored user name and password for a particular user in the users table, server 130 may obtain the user's profile from database 500 (act 810). For example, server 130 may identify a profile for the user from the user's record in the users table. As set forth above, the user's profile not only identifies activities that the user is permitted to perform, but also identifies menu items that may be used to dynamically construct a graphical user interface for the user.

Server 130 may dynamically build one or more graphical user interfaces (GUIs) for the user based on the user's profile (act 815), as described in copending, U.S. patent application Ser. No. 11/298,604, entitled "PROFILE-BASED USER ACCESS TO A NETWORK MANAGEMENT SYSTEM," filed concurrently herewith, the entire contents of which are expressly incorporated by reference herein. Once built, the graphical user interfaces may be provided to client 120 (act 815). The graphical user interfaces may allow the user to identify an activity and the specific devices on which the activity is to be performed.

Assume, for explanatory purposes, that the user has identified that an add user activity is to be performed and has identified the devices on which the activity is to be performed. The user may cause client 120 to transmit an activity request to server 130. The activity request may include the information entered by the user into the graphical user interfaces.

Upon receipt of the activity request (act 820), server 130 may assign a transaction number to the activity (act 825). Server 130 may, for example, sequentially assign transaction numbers. Therefore, server 130 may increment the most-recent transaction number by one to obtain the transaction number to assign to this activity. Server 130 may begin tracking the performance of the activity (act 825). For example, server 130 may store some or all of the information from the request, such as the identity of the user, the identity of the activity to be performed, and the identity of the devices on which the activity is to be performed. Server 130 may thereafter track all commands and parameters that are generated, transmitted, and/or received in connection with the performance of the activity on the devices, as described in copending, U.S. patent application Ser. No. 11/298,603, entitled "TRACKING USER ACCESS OF A NETWORK MANAGEMENT SYSTEM," filed concurrently herewith, the entire contents of which are expressly incorporated by reference herein. The tracking may be performed, for example, by log logic 440 (FIG. 4).

Server 130 may translate the received activity request into the physical commands needed to perform the activity on each of the devices (act 830). In one implementation consistent with the principles of the invention, server 130 may identify the physical commands corresponding to the activity for each device on which the activity is to be performed using database 500 (e.g., using activity_has_command table). Each set of physical commands may be in the native syntax of the device on which the commands will be performed. Therefore, server 130 translates a received activity request into sets of physical commands that are in the native syntax of the devices on which those commands will be performed.

As set forth above, server 130 may include a group of agents 430 (FIG. 4) that cause the activity to be performed on the devices. Agents 430 may receive the physical commands for the devices and interact with the devices to cause the physical commands to be performed on the devices (act 835).

Agents 430 may transmit commands and/or parameters to the devices and receive information from the devices. For example, an agent 430 may transmit physical commands and parameters to a device (in the device's native syntax) that instructs the device to perform the activity (add a specified user in the example above). Upon completion of the activity, the device may transmit information to the agent indicating what activity was performed and the result of performing the activity.

Agents 430 may forward all information that is transmitted to the devices and all information received from the devices to log logic 440. In this way, log logic 440 may create a log for each device for which an activity was performed (act 840). Agents 430 may also store information relating to the user, the activity the user performed, and the devices on which the activity was performed in, for example, the csplog table of database 500.

Once the user has caused the activity request to be transmitted to server 130, server 130 may provide additional graphical user interfaces to the user. The user may perform another activity on, for example, another device type or platform, or may view the status of the previous activity (or other activities).

CONCLUSION

Implementations consistent with the principles of the invention allow users to describe relationships in a relational database between logical activities and the physical commands needed to perform those logical activities. In this way, changes can be quickly and easily implemented in a number of network devices without the need to manually configure each network device to reflect the change.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on server 130 performing certain acts and client 120 performing certain acts, it will be appreciated that in other implementations consistent with the principles of the invention, client 120 may perform some of the acts described as being performed by server 130 and server 130 may perform some of the acts described as being performed by client 120.

While series of acts have been described with respect to FIGS. 7A-9, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:

A memory to store instructions and a relational database, where the relational database includes:

A table that provides a relationship between a logical grouping of remote devices and at least on activity of a plurality of logical activities that is permitted to be performed on the logical grouping of remote devices;

A table that defines a relationship between users and profiles;

A table that defines a relationship between the profiles and the plurality of logical activities; and A table that defines a relationship between the plurality of logical activities and groups of physical commands that perform the logical activities; and a processor to execute the instructions to:

Receive a request to perform one logical activity of the plurality of logical activities, Translate the one logical activity into one of the groups of physical commands using the relational database; and Cause the one or more logical activity to be performed on one of the remote devices using the one of the groups of physical command.

2. The system of claim 1 where the one of the groups of physical commands is in a native syntax of the remote device.

3. The system of claim 1 where the relational database includes: a table the provides a relationship between the users and the profiles identifies activities of the plurality of logical activities that the users are permitted to perform.

4. The system of claim 1 where the request identifies a plurality of remote devices on which the one logical activity is to be performed, and Where, when translating the one logical activity, the processing logic is configured to:

Translate the one logical activity into groups of physical commands, including the one of the groups of physical commands and at least one other one of the groups of physical commands, using the relational database, the groups of physical commands having different syntax; and Where, when causing the one logical activity to be performed, the processing logic is configured to:

Cause the one logical activity to be performed on the plurality of remote devices using the groups of physical commands.

5. The system of claim 1, where the logical grouping of remote device includes a grouping of remote devices that work together to perform a specific function.

6. The system of claim 1, where the logical grouping of remote devices include at least two different types of devices.

7. The system of claim 1, where the relational database further includes:

A table that provides a relationship between the logical grouping of remote devices and the remote devices that are part of the logical grouping of remote devices.

8. The system of claim 1 where the one logical activity includes an add user activity, a delete user activity, or a change password activity.

9. The system of claim 1, where the relational database further includes:

A table that defines a relationship between platforms and the plurality of logical activities; and A table that defines a relationship between the remote devices and the platforms.

10. A method comprising:

Creating, by a computing device, a first table that defines a relationship between uses and profiles;

Creating, by the computing device, a second table that defines a relationship between the profiles and a plurality of logical activities, each of the profiles being associated with at least one of the plurality of logical activities that is permitted for the user to which the profile is related;

Creating, by the computing device, a third table that defines a relationship between the plurality of logical activities and groups of physical commands that perform the plurality of logical activities; and Using, by the computing device, the first, second and third tables to remotely configure a plurality of devices.

11. The method of claim 10 where the groups of physical commands are in the syntax of the plurality of devices.

12. The method of claim 10 further comprising:

creating a fourth table that defines a relationship between platforms and the plurality of the logical activities; and creating a fifth table the defines a relationship between the plurality of devices and the platforms.

13. The method of claim 12 further comprising:

remotely configured a platform in response to a single logical activity request, using information in the fourth table and information in the fifth table.

14. The method of claim 12 where the first table, the second table, the third table, the fourth table, and fifth table are part of a relational database.

15. The method of claim 10 wherein the plurality of logical activities includes at least one of an add user activity, a delete user activity, or a change password activity.

* * * * *